J. C. OWENS.
MUFFLER TOILET VALVE.
APPLICATION FILED JAN. 31, 1921.
1,426,093.
Patented Aug. 15, 1922.
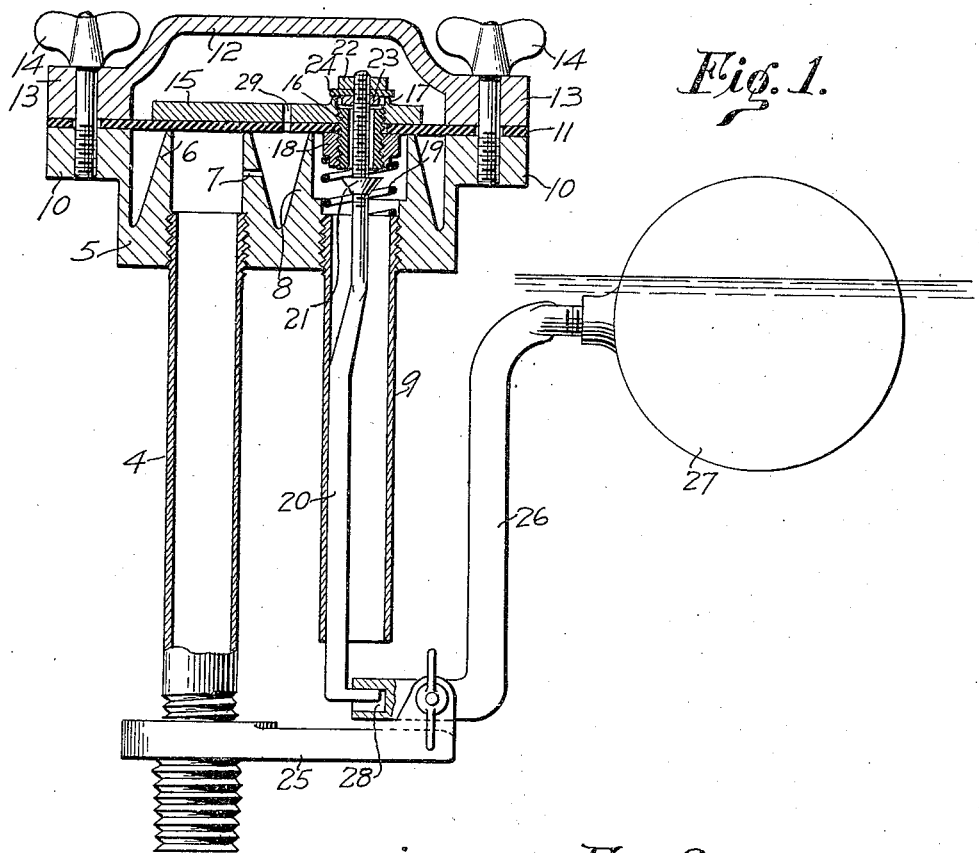
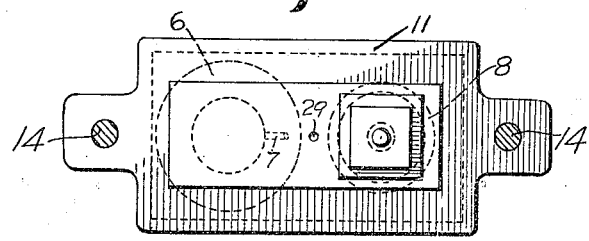
INVENTOR.
Jesse C. Owens
BY Nestall and Wallace
ATTORNEYS.

UNITED STATES PATENT OFFICE.

JESSE C. OWENS, OF LOS ANGELES, CALIFORNIA.

MUFFLER TOILET VALVE.

1,426,093.   Specification of Letters Patent.   Patented Aug. 15, 1922.

Application filed January 31, 1921. Serial No. 441,125.

*To all whom it may concern:*

Be it known that I, JESSE C. OWENS, a citizen of the United States, and resident of Los Angeles, in the county of Los Angeles and State of California, have invented new and useful Improvements in a Muffler Toilet Valve, of which the following is a specification.

This invention relates to mechanism for closet flush tanks, and pertains particularly to a ball cock valve mechanism for controlling the filling of the tank.

The objects of this invention are first, to provide a mechanism of the character described which is silent in operation; second, to provide a mechanism having a valve held on its seat by the pressure of the water supply; and third, to provide a mechanism in which a constant inlet area for water is provided during filling of the tank, the valve opening full at the beginning of the filling operation and remaining fully open until the tank has filled.

For the purpose of a detailed description of an embodiment of my invention, reference is had to the accompanying drawing, in which:

Fig. 1 is an elevation partly in section of a mechanism suitable for installation in a tank; and Fig. 2 is a plan view with the cover removed.

Referring more particularly to the drawing, an intake tube for connection to the service pipe is indicated by 4. This tube is threaded into the base 5 of a dome. The intake port extends through an elevated seat 6, with which a valve diaphragm cooperates. Extending laterally through the seat is a duct 7. A second threaded opening provided with an elevated seat 8 is formed in the base. Threaded into the last mentioned opening is a discharge tube 9. The base 5 has ears 10 provided with threaded openings to receive bolts.

Mounted upon the top of the base is a diaphragm 11 formed of resilient material. This diaphragm also acts as a gasket between the base 5 and cover 12 of the dome. The cover corresponds in plan to the base, having ears 13 with apertures through which wing bolts 14 are passed to secure the cover and base together.

A metallic plate 15 rests upon the diaphragm and is provided with a threaded opening in which is mounted a bushing 16, the latter extending below the diaphragm. An annular bead 17 is formed on the plate concentric with the opening. This bead serves as a seat for a valve disk. Threaded onto the bushing below the diaphragm is a nut 18. A spring 19 is interposed between the end of the discharge tube and the nut 18. This spring tends to lift the diaphragm off the seat 8. Loosely extending through the bore of the bushing 16 is a stem 20. A clearance is left between the stem and bore to permit the flow of water therethrough. A washer 21 is threaded on the stem below the bushing. Threaded on the upper end of the stem is a nut 22, and a washer 23 clamps a rubber washer or valve disk 24 to the end of the stem. Washers 21 and 24 are so adjusted that the stem when lifted first raises disk 24 off its seat, then washer 21 abuts the bushing 16 and raises the diaphragm.

Mounted upon the lower end of the intake tube is a bracket 25 and pivotally mounted thereon is a float lever 26 having the usual ball float 27 mounted thereon for operation by the rise and fall of the water in the tank. The stem 20 is offset at its lower end and is disposed in a bore 28 of the float lever. Sufficient clearance is allowed between the wall of the bore and the stem so that movement of the float lever will cause the latter to kick the stem.

The mechanism is adapted to be placed in a flush tank and the intake tube 4 connected to the house service pipe, the discharge tube 9 being in communication with the flush tank. Water fills both the upper and lower compartments of the dome. Assume that the flush tank is full, the float being in the position shown in Fig. 1. The water pressure in the upper compartment is the same as that in the intake tube, due to the communication of the upper compartment with the intake tube through duct 7 and an equalizing port 29. The water pressure holds the diaphragm over the discharge port closing the latter. If the tank is drained, the float lever drops, kicking the stem and lifting the relief port valve 24 off its seat. This permits water to flow from the upper compartment through the discharge tube, thereby relieving the pressure in the upper compartment. The stem continues in its movement until the washer 21 abuts the bushing 16 and forces the diaphragm upwardly, lifting the latter from its seats over the intake and discharge ports. Water then flows from the intake port directly to the discharge port.

The tank fills and raises the float lever, depressing the stem and closing the relief port. Water enters the upper compartment through the equalizing port and forces the diaphragm upon its seat over the discharge port and over the intake port, thereby closing communication between the intake and discharge.

What I claim is:

1. In a device of the class described, the combination of a chamber having a diaphragm dividing it into upper and lower compartments, said lower compartment having an intake for liquid opening thereinto and normally closed by said diaphragm, and a discharge for liquid opening thereinto and normally closed by said diaphragm, there being an equalizing passage for transmission of pressure from the intake to the upper compartment, and means to lift said diaphragm and place said intake and discharge in communication.

2. In a device of the class described, the combination of a chamber having a diaphragm dividing it into upper and lower compartments, said lower compartment having an intake for liquid opening thereinto and normally closed by said diaphragm, and a discharge for liquid opening thereinto and normally closed by said diaphragm, there being an equalizing passage for transmission of pressure from the intake to the upper compartment, a stem connected to said diaphragm for lifting the latter, and means to actuate said stem.

3. In a device of the class described, the combination of a chamber having a diaphragm dividing it into upper and lower compartments, said lower compartment having an intake for liquid opening thereinto and normally closed by said diaphragm and a discharge for liquid opening thereinto and normally closed by said diaphragm, said diaphragm having a relief port for affording communication between the upper compartment and said discharge, valve means normally closing said relief port, and means to initially actuate said valve means to open said relief port and after an interval lift said diaphragm to place said intake and discharge in communication.

4. In a device of the class described, the combination of a chamber having a diaphragm dividing it into upper and lower compartments, said lower compartment having an intake for liquid opening thereinto and normally closed by said diaphragm and a discharge for liquid opening thereinto and normally closed by said diaphragm, said diaphragm having a relief port for affording communication between the upper compartment and said discharge, valve means normally closing said relief port, there being an equalizing passage for transmission of pressure from the intake to the upper compartment, and means to initially actuate said valve means to open said relief port and after an interval lift said diaphragm to place said intake and discharge in communication.

5. In a device of the class described, the combination of a chamber having a diaphragm dividing it into upper and lower compartments, said lower compartment having an intake for liquid opening thereinto and normally closed by said diaphragm and a discharge for liquid opening thereinto and normally closed by said diaphragm, said diaphragm having an opening registering with said discharge, a stem loosely passing through said opening with clearance therebetween to form a relief port for said upper compartment, a relief valve mounted upon said stem and adapted to normally close said relief port, said stem having an abutment thereon to engage said diaphragm after said relief valve has been lifted to open the relief port and means to lift said stem.

In witness that I claim the foregoing I have hereunto subscribed my name this 26th day of January, 1921.

JESSE C. OWENS.